United States Patent [19]

Tsujimura

[11] Patent Number: 4,980,103

[45] Date of Patent: Dec. 25, 1990

[54] METHOD FOR MANUFACTURING PARTS SUCH AS PISTONS AND CYLINDER HEADS FOR AN INTERNAL COMBUSTION ENGINE

[75] Inventor: Akira Tsujimura, Kawasaki, Japan

[73] Assignee: Isuzu Motors Limited, Tokyo, Japan

[21] Appl. No.: 435,104

[22] Filed: Nov. 9, 1989

Related U.S. Application Data

[62] Division of Ser. No. 288,584, Dec. 22, 1988.

[30] Foreign Application Priority Data

Dec. 25, 1987 [JP] Japan ................................ 62-326864

[51] Int. Cl.$^5$ .............................................. C04B 35/80
[52] U.S. Cl. ...................................... 264/56; 501/32; 501/95; 501/97
[58] Field of Search ............... 501/32, 95, 97; 264/56; 123/668

[56] References Cited

U.S. PATENT DOCUMENTS

| 3,129,105 | 4/1964 | Berry et al. | 501/95 |
| 3,752,683 | 8/1973 | Hawthorne | 501/95 |
| 4,715,422 | 12/1987 | Tommis | 501/95 |

FOREIGN PATENT DOCUMENTS 1006170 1/1986 Japan ..................... 501/95

Primary Examiner—James Derrington
Attorney, Agent, or Firm—Dykema Gossett

[57] ABSTRACT

Parts for an internal combustion engine such as a piston and a cylinder head manufactured by mixing inorganic coating material with potassium titanate fibers, silicon nitride whiskers and/or glass balloons, adding to and mixing with the above mixture calcium oxide (CaO) as a hardening promoter, drying the article so produced, and baking the same. The potassium titanate fibers is 5 to 40%, the silicon nitride whisker is 10 to 50%, and the glass balloon is 0 to 15% in weight of the inorganic coating material, and the calcium oxide is 1 to 10% of the total weight of the potassium titanate fibers, silicon nitride whiskers and/or glass balloons. The drying time is reduced by adding CaO as a hardening promoter.

2 Claims, No Drawings

METHOD FOR MANUFACTURING PARTS SUCH AS PISTONS AND CYLINDER HEADS FOR AN INTERNAL COMBUSTION ENGINE

This is a divisional of co-pending application Ser. No. 07/288,584 filed on Dec. 22, 1988.

BACKGROUND OF THE INVENTION

1. Technical Field

The present invention relates to parts for internal combustion engines such as pistons and cylinder heads and methods of manufacturing the same.

2. Background Art

It is a general practice to use solid ceramics such as silicon nitride, zirconia, mullite, and aluminum titanate for a thermal insulator of parts for internal engines such as pistons and cylinder heads. One problem here is that, even though these ceramics are of sufficiently high strength, they tend to degrade volumetric efficiency of the engine because of their high thermal conductivities.

Ceramic materials having a small thermal conductivity, on the other hand, art available in the form of foamed ceramics and laminates made from ceramic fibers. However, since their strength is no more than several tens of $kgf/cm^2$, they cannot withstand the firing pressures that are generated by the combustion of fuel.

Subsequently, heat insulating composites made from inorganic fibers and/or hollow particles with a coating material prepared from a metallic alkoxide as the binder have been devised to correct these drawbacks, but a deficiency with these materials is that they need to be dried for a long period of time prior to the baking process.

SUMMARY OF THE INVENTION

This invention has been created in order to overcome these difficulties found with the conventional materials and manufacturing method, and has, as its first purpose, to provide parts for internal combustion engines such as pistons and cylinder heads that are not only strong enough to withstand the firing pressures, but also of a low thermal conductivity in order to realize a high volumetirc efficiency.

The second purpose is to provide a method of manufacturing these parts in which time for drying prior to baking is shortened.

DESCRIPTION OF PREFERRED EMBODIMENT

An inorganic coating material made mainly from silica and titania (for example, the "Glasca E 1101" of Nippon Gosei Gomu Kabushiki Kaisha (Japan Synthetic Rubber Co., Ltd.)), whose solid components are reckoned to be 100 in weight, was added to potassium titanate fibers whose weight is 15 with respect to 100 of the solid components of the inorganic coating material, silicon nitride whiskers of 20 in weight, and glass balloons (which are hollow particles of glass) of 5, and all of them were mixed up well in a kneading machine. Then, calcium oxide of 0.8 in weight with respect to this mixture was added and they were poured under pressure into an enclosed mold of a preselected form.

As this slurry started hardening about three hours after pouring, the core was removed, a lid was placed to enclose the article completely, and it was left standing to dry. Here, complete enclosure is important because otherwise deformation or even cracking of the article may occur since the drying condition differs between the part that is directly exposed to the atmosphere and the part that is not.

The drying was continued with the article completely enclosed for more than 12 hours, then the article was baked at 1,100° C. for 30 minutes, obtaining the product thermal insulator, whose thermal conductivity was 1.5 kcal/m. h. ° C. and the compressive strength was more than 560 $kgf/cm^2$.

It was found that addition of potassium titanate fibers and silicon nitride whiskers less than 5 and 10 in weight respectively with respect to 100 of the solid components of the inorganic coating material brought about insufficient thermal conductivities, while addition of them more than 40 and more than 50 respectively brought about insufficient strength. Addition of glass balloons of more than 15% resulted in similar failure.

Most inorganic coating materials that are commercially available can be used in the present invention.

The present invention is not limited to the above described embodiment. For example, the CaO to be mixed may have a weight percentage of between 1% and 10% with respect to the total weight of the potassium titanate fiber, silicon nitride whiskers and glass balloons, and the glass balloons to be mixed may have a weight part of zero with respect to 100 weight parts of the inorganic coating material.

I claim:

1. A method of manufacturing a part for an internal combustion engine, comprising the steps of:
   (A) kneading an inorganic coating material with the following substances, so as to produce a primary mixture, said substances having the following weight parts respectively with respect to the solid components of the inorganic coating material taken as 100 parts
      potassium titanate fibers of 5–40 parts,
      silicon nitride whiskers of 10–50 parts, and
      glass balloons of 0–15 parts;
   (B) adding and kneading with the primary mixture calcium oxide (CaO) possessing a weight percentage of 1–10% of the total weight of said primary mixture, so as to produce a secondary mixture;
   (C) introducing the secondary mixture under pressure into an enclosed mold of a predetermined shape;
   (D) drying the secondary mixture for a predetermined period while completely enclosed, so as to make a dried article;
   (E) separating the dried article from the mold; and
   (F) baking the dried article so as to make said part.

2. A method of manufacturing parts for an internal combustion engine, comprising the steps of:
   (A) kneading an inorganic coating material with the following substances, so as to form a primary mixture, where the substances have the following weight parts respectively with respect to the solid components of the inorganic coating material which is taken as 100 parts
      potassium titanate fibers of 5–40 parts, and
      glass balloons of 0–15 parts;
   (B) adding calcium oxide (CaO) possessing a weight percentage of 1–10% of the total weight of said primary mixture, so as to form a secondary mixture;
   (C) pouring the secondary mixture under pressure into an enclosed mold of a predetermined shape;
   (D) drying the secondary mixture for a predetermined period while completely enclosed, so as to make a dried article;
   (E) separating the dried article from the mold; and
   (F) baking the dried article, so as to make said part.

* * * * *